United States Patent
Orth

(10) Patent No.: US 9,371,487 B2
(45) Date of Patent: Jun. 21, 2016

(54) PROCESS AND PLANT FOR PRODUCING CHAR AND FUEL GAS

(75) Inventor: Andreas Orth, Friedrichsdorf (DE)

(73) Assignee: OUTOTEC OYJ, Espoo (FI)

( * ) Notice: Subject to any disclaimer, the term of this patent is extended or adjusted under 35 U.S.C. 154(b) by 733 days.

(21) Appl. No.: 12/747,334

(22) PCT Filed: Dec. 12, 2007

(86) PCT No.: PCT/EP2007/010878
§ 371 (c)(1),
(2), (4) Date: Jun. 10, 2010

(87) PCT Pub. No.: WO2009/074170
PCT Pub. Date: Jun. 18, 2009

(65) Prior Publication Data
US 2010/0263487 A1  Oct. 21, 2010

(51) Int. Cl.
| | |
|---|---|
| *C01B 3/36* | (2006.01) |
| *C10B 49/10* | (2006.01) |
| *C10J 3/46* | (2006.01) |
| *C10J 3/62* | (2006.01) |
| *C21B 11/10* | (2006.01) |
| *C21B 13/00* | (2006.01) |
| *C21B 13/08* | (2006.01) |

(52) U.S. Cl.
CPC ............ *C10B 49/10* (2013.01); *C10J 3/463* (2013.01); *C10J 3/62* (2013.01); *C21B 11/10* (2013.01); *C21B 13/002* (2013.01); *C21B 13/0066* (2013.01); *C21B 13/0073* (2013.01); *C21B 13/085* (2013.01); *C10J 2300/0903* (2013.01); *C10J 2300/093* (2013.01); *C10J 2300/0906* (2013.01); *C10J 2300/0909* (2013.01); *C10J 2300/0959* (2013.01); *C10J 2300/0973* (2013.01); *C10J 2300/16* (2013.01); *C10J 2300/1807* (2013.01); *C10J 2300/1838* (2013.01); *Y02P 10/136* (2015.11); *Y02P 10/138* (2015.11)

(58) Field of Classification Search
None
See application file for complete search history.

(56) References Cited

U.S. PATENT DOCUMENTS

| | | | | |
|---|---|---|---|---|
| 2,788,314 | A * | 4/1957 | Schmalfeld et al. | ............ 201/28 |
| 3,698,882 | A * | 10/1972 | Garrett et al. | ................... 48/210 |
| 3,736,233 | A * | 5/1973 | Sass et al. | ....................... 201/17 |

(Continued)

FOREIGN PATENT DOCUMENTS

| | | |
|---|---|---|
| AU | 2005237179 A1 | 6/2007 |
| DE | 0222452 A1 | 5/1987 |

(Continued)

OTHER PUBLICATIONS

International Search Report for PCT/EP2007/010878 mailed on Dec. 17, 2008.

*Primary Examiner* — Imran Akram
(74) *Attorney, Agent, or Firm* — Leydig, Voit & Mayer, Ltd.

(57) ABSTRACT

A method for producing char and fuel gas includes degasifying a carbonaceous material with oxygen-containing gases in a fluidized bed reactor at a temperature of more than about 1000° C. and at a pressure of from about 1 bar to about 40 bar. A supply of oxygen within the fluidized bed reactor is adjusted so as to recover more than 60% of fixed carbon in the carbonaceous material in a char product, and an oxygen availability in a lower or bottom region of the fluidized bed reactor is less than 80% of an oxygen availability in an upper region of the fluidized bed reactor.

15 Claims, 1 Drawing Sheet

(56) References Cited

U.S. PATENT DOCUMENTS

| | | | |
|---|---|---|---|
| 3,804,581 A * | 4/1974 | Schmalfeld et al. | 432/58 |
| 3,846,096 A * | 11/1974 | Malian et al. | 48/209 |
| RE29,312 E * | 7/1977 | Mallan et al. | 48/209 |
| 4,153,514 A * | 5/1979 | Garrett et al. | 201/2.5 |
| 4,358,344 A * | 11/1982 | Sass et al. | 201/4 |
| 4,375,402 A * | 3/1983 | Durai-Swamy | 208/411 |
| 4,444,568 A * | 4/1984 | Beisswenger et al. | 48/197 R |
| 4,474,583 A | 10/1984 | Chen et al. | |
| 4,757,771 A * | 7/1988 | Narisoko et al. | 110/245 |
| 4,789,580 A | 12/1988 | Hirsch et al. | |
| 7,803,268 B2 | 9/2010 | Orth et al. | |
| 2002/0112567 A1* | 8/2002 | Kawakami et al. | 75/524 |
| 2002/0124690 A1 | 9/2002 | Orth et al. | |
| 2004/0141891 A1 | 7/2004 | Abe et al. | |
| 2005/0144844 A1* | 7/2005 | Miyoshi et al. | 48/102 R |
| 2006/0137579 A1* | 6/2006 | Fujimura et al. | 110/245 |
| 2006/0249100 A1 | 11/2006 | Freytag et al. | |
| 2006/0278566 A1 | 12/2006 | Orth et al. | |

FOREIGN PATENT DOCUMENTS

| | | |
|---|---|---|
| DE | 10260734 A1 | 7/2004 |
| EP | 0062363 A1 | 10/1982 |
| EP | 10260738 A1 | 7/2004 |
| JP | 2003105351 A | 4/2003 |
| WO | WO 02056744 A2 | 7/2002 |
| WO | WO 2004056941 A1 | 7/2004 |
| WO | WO 2007054207 A1 | 5/2007 |
| WO | WO 2007055815 A1 | 5/2007 |
| WO | WO 2007128370 A1 * | 11/2007 |

* cited by examiner

PROCESS AND PLANT FOR PRODUCING CHAR AND FUEL GAS

CROSS REFERENCE TO PRIOR APPLICATIONS

This application is a U.S. National Phase application under 35 U.S.C. §371 of International Application No. PCT/EP2007/010878, filed on Dec. 12, 2007. The International Application was published in English on Jun. 18, 2009 as WO 2009/074170 A1 under PCT Article 21(2).

FIELD

The present invention involves a process for producing char and fuel gas in which carbonaceous material such as coal is degasified with oxygen containing gases in a fluidized bed reactor with a circulating fluidized bed in the presence of steam at a temperature of more than about 1000° C. and at a pressure of about 1 bar to about 40 bar, as well as to a corresponding plant.

BACKGROUND

EP 0 062 363 A1 describes a process and a plant for producing fuel gas and process heat from carbonaceous materials. In this process, coal or the like reacts with oxygen containing gases in the presence of steam in a fluidized bed reactor. The degasification is carried out at a pressure of up to 5 bar and at a temperature of 800° C. to 1100° C. To maximize the amounts of fuel and heat which can be obtained from this process, the parameters of the fluidized bed reactor are adjusted such that 40% to 80% of the carbon of the starting material is reacted in the fluidized bed reactor. A similar process is described in U.S. Pat. No. 4,474,583 and JP 2003105351.

Many metallurgical processes like the smelting reduction of iron ores in a smelt reduction vessel (HIsmelt-SRV) or the reduction of ilmenite in a rotary kiln require carbonaceous material such as coke breeze, char, anthracite or power station coal. However, the known processes in which a maximum amount of fuel and heat is produced are not appropriate to obtain enough char or the like for use in such metallurgical processes. Further, a low volatile content of the char is preferred as this leads to energy savings and to an increased production in the metallurgical processes.

SUMMARY

An aspect of the present invention is to provide a process and a plant for producing char and fuel gas improving the use of carbon for providing the necessary heat for the charring process and thus generating a relatively large amount of char with the simultaneous generation of fuel gas.

In an embodiment, the present invention provides a method for producing char and fuel gas which includes degasifying a carbonaceous material with oxygen-containing gases in a fluidized bed reactor at a temperature of more than about 1000° C. and at a pressure of from about 1 bar to about 40 bar. A supply of oxygen within the fluidized bed reactor is adjusted so as to recover more than 60% of fixed carbon in the carbonaceous material in a char product, and an oxygen availability in a lower or bottom region of the fluidized bed reactor is less than 80% of an oxygen availability in an upper region of the fluidized bed reactor.

BRIEF DESCRIPTION OF THE DRAWINGS

The present invention is described in greater detail below on the basis of embodiments and of the drawings in which.

DETAILED DESCRIPTION

Figure 1:
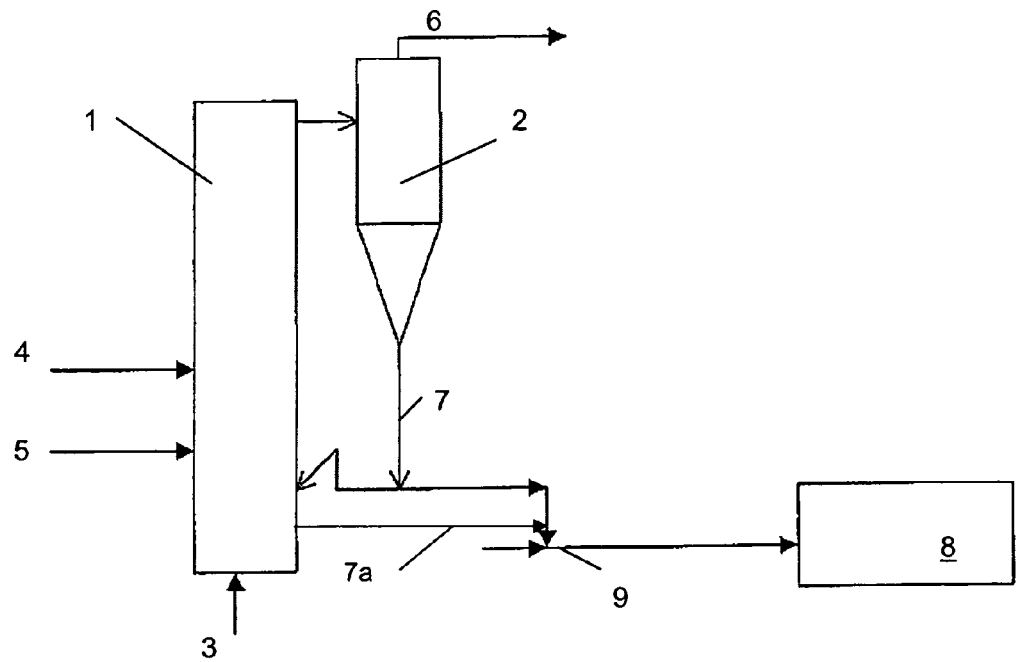
FIG. 1 shows a process diagram of a process and a plant in accordance with a first embodiment of the present invention.

The present invention combines the production of hot char and fuel gas in a way that only a minimal amount of carbon is used for providing the necessary heat for the charring process. Consequently, high caloric fuel gas can be produced while simultaneously recovering most of the carbon in the solid product which may be used for further metallurgical processes. Char according to the present invention is carbonaceous material, which is heat treated and contains mainly carbon and ash with some remaining low contents of mainly hydrogen and oxygen.

According to an embodiment of the present invention, the supply of oxygen within the reactor can be adjusted or regulated such that the oxygen availability in a lower or bottom region of the reactor is smaller compared with an upper region of the reactor. The supply of oxygen within the reactor can, for example, be adjusted or regulated such that the oxygen availability in a lower or bottom region of the reactor is less than 50%, for example, less than 80%, of the oxygen availability in an upper region of the reactor. For example, the oxygen availability in a lower or bottom region of the reactor may be less than 90% of the oxygen availability in an upper region of the reactor. By doing this, the reactor is theoretically separated into two sections. The lower one is low in free oxygen supply and therefore less fixed carbon is combusted, resulting in a higher yield of carbon especially in the desired coarse particle product.

Most of the energy of the process is provided in the upper part of the reactor where volatiles and fine coal particles are combusted, for example, with injected oxygen, in a zone with still high particle concentration and therefore good heat transfer, avoiding agglomeration of the particles, which occur quite easily in reactor systems where the combustion zone is diluted, such as bubbling fluidized beds. In addition, the circulation of particles within the reactor ensures a good heat transfer, which is also critical in diluted free boards of conventional, stationary fluidized or fixed bed reactors.

As volatiles are not fixed, carbon and fine particles would be lost with the offgas stream anyhow, the combusted carbon units do not effect the yield of fixed carbon significantly. However, by the means of separating the reactor and having a zone dedicated to the generation of energy, high yields of fixed carbon (>60%) can be achieved in a fluidized bed reactor even at high temperatures in the range of 1000° C. and above, avoiding the generation of significant amounts of tars.

The yield of more than 60% of the fixed carbon, for example, more than 70%, in the product may be achieved by using a circulating fluidized bed (CFB) reactor wherein gas or air with a content of oxygen of less than 5% is fed into a lower part and/or the bottom of the reactor as a fluidisation gas and wherein oxygen enriched gas or air with a content of oxygen of 50% to about 100%, for example, between 90% and 99%, especially with a content of oxygen of at least 95%, is fed into an upper part of the fluidized bed reactor as secondary gas.

According to an embodiment of the present invention, the temperature of the reaction in the circulating fluidized bed of the fluidized bed reactor can, for example, be between about 1000° C. and about 1100° C. Although the temperature may be within a range of 950° C. to 1150° C., for example, between 980° C. and 1100° C., the temperature of the reaction can, for example, be above 1000° C., such as above 1050° C. The pressure of the reaction in the inventive process may be between 1 bar and 40 bar, for example, between 1.1 and 30 bar. The pressure in the fluidized bed reactor can, for example, be between above about 5 bar and below 20 bar.

In addition or as an alternative to the above, a mixture of steam and gas or air or mixtures of these gases are fed into the circulating fluidized bed of the fluidized bed reactor as primary fluidizing gas. Recycling gas may also be used. The amount and ratio of feed gases and their contents of $O_2$ and other components may be adjusted.

The inventive process is adjusted such that in addition to char, a high caloric fuel gas is produced. The fuel gas produced by degasification of carbonaceous material in the fluidized bed reactor can, for example, have a minimum heating value of 9 $MJ/m^3$ (STP). This fuel gas can, for example, have a low tar content.

To ensure the reuse of thermal energy and fuel gas within the inventive process, a closed circuit gas flow system may be provided with the offgas of the fluidized bed reactor being fed to a waste heat boiler to produce steam and being introduced at least partially as fluidizing gas in the fluidized bed reactor. This amount may be controlled and adjusted. The gas leaving the waste heat boiler may be partly dedusted in a multiclone or any other type of dust removal system, for example, a fabric or ceramic or metallic filter or an electrostatic precepitator, and fed to a process gas scrubber unit for further cleaning and cooling prior to reintroducing the fuel gas into the fluidized bed reactor. Furthermore, the contents of the circulation gas can be controlled by adding or removing components such as $H_2O$, $CO_2$, $O_2$, pollutants and/or impurities. Prior to the use of fuel gas or recycle gas, it is also possible to reheat the gas, for example, by heat transfer or partial combustion, and use energy of the process for reheating.

The solid produced in the fluidized bed reactor, for example, hot char, can be transferred into a plant like a smelting furnace or a rotary kiln at a temperature of more than about 750° C., for example, between 950° C. and 1100° C. The thermal energy of the hot char produced in the fluidized bed reactor may thus be reused in a further metallurgical process.

In an embodiment of the present invention, the produced hot char can be transferred by a pneumatic injection and/or transport system to a plant for a metallurgical process like smelting reduction of iron or reduction of ilmenite. As an alternative, the hot char is not directly conveyed to the metallurgical plant but may be collected in an intermediate storage bin from where it is fed to smelting or reduction reactors or the like. The produced char may thus be stockpiled or filled into closed silo train bins for transport. It is also possible to use the char for any other convenient processes like as a supplement for sintering, pelletizing, electric winning of metals as well as for non metallurgical processes like power plants or the production of elemental phosphorus.

Wet coal as carbonaceous feeding material can be predried and crushed to a particle size of below 10 mm prior to feeding the coal into the fluidized bed reactor. The wet coal can be fed from a stockpile with a transport system to a wet coal bin. This wet coal bin may have a storage capacity for 15 hours of operation. The received coal can be crushed and simultaneously dried to remove as much surface moisture as possible. After that, the coal may be stored in a bin for dried coal and/or be transported continuously by a pneumatic conveying and dosing system in the fluidized bed reactor. As a carbonaceous feeding material, anthracite and steaming coals having a moisture content reduced to lower than 5% and/or lignites and brown coals having a surface moisture content reduced below 17% may be used. The water content of the pre-dried coal can be controlled according to the desired process needs. Effluent gas from the coal drying may be removed from the other gas and may be treated in a special plant, for example as described in AU 2005 237 179, or reused in the process, for example, as a steam containing gas after heating for injection into the upper part of the reactor or as part of the fluidising gas and/or recycling gas. The pre-dried coal may be heated and a part of the volatile matter can be removed during this heating. This gas stream may also be handled separately, for example, as a process gas or for combustion.

For the use in metallurgical processes, a low volatile content of char can be used as this leads to energy savings and to an increased production. Thus, according to an embodiment of the present invention, the volatile content of the char produced in the fluidized bed reactor can be below 10 wt.-%, for example, below 4 wt.-%.

A plant in accordance with the present invention which is suited for performing the above-described process for producing char and fuel gas comprises a fluidized bed reactor, for example, with a circulating fluidized bed or an annular fluidised bed reactor as described in DE 102 60 734 with internal circulation, a further reactor for a further metallurgical process and a pneumatic injection and/or transportation system being provided between the fluidized bed reactor and the further reactor. The fluidized bed reactor is provided with an inlet for a primary fluidizing gas provided in a lower region of the reactor and connected to a supply of steam and gas or air or mixtures with these gases, an inlet for a secondary gas provided above said inlet for a primary fluidizing gas and connected to a supply of oxygen enriched gas or air or mixtures with these gases and an inlet for solids connected to a supply of dried and crushed coal or the like carbonaceous material. According to the present invention, the inlet for a primary fluidizing gas is connected to the first supply of gas or air having an oxygen content which is smaller compared with the oxygen content of the second supply of oxygen enriched gas or air to which the inlet for a secondary gas is connected. This ensures that the lower region of the reactor is low in free oxygen and therefore less fixed carbon is combusted, resulting in a higher yield of carbon especially in the desired coarse particle product. In this case, most of the energy of the process can be provided in the upper part of the reactor where volatiles and fine coal particles are combusted, for example, with injected oxygen in a zone with still high particle concentration and therefore good heat transfer, avoiding agglomeration of the particles. It should be noted that according to the present invention, the plant may be configured such that the char produced in the fluidized bed reactor may be stockpiled or filled into closed silo train bins for transport instead of or prior to transferring the hot char into a further reactor for a further metallurgical process.

In an embodiment of the present invention, a cyclone and/or a multiclone can be provided downstream of the fluidized bed reactor for separating char and dust from fuel gas with an outlet of the cyclone and/or the multiclone being connected to a conduit for feeding fuel gas as fluidizing gas into the fluidized bed reactor and/or into a fluidized bed cooler being provided downstream of the fluidized bed reactor. Alternatively, any other dust removal system might be used, such as a fabric or ceramic filter or an electrostatic precipitator. A closed circuit gas flow system may thus be provided for recycling and reusing at least a part of the produced process gas for fluidization.

The char can be transferred into a further reactor for a further process, for example, a reactor for a metallurgical process, like a smelting furnace for a smelting reduction of iron or a rotary kiln for a reduction of ilmenite or an electric furnace for winning of metals. Prior to transferring the char into the further reactor, the char may be cooled down and/or mixed with dust in a fluidized bed reactor.

Another option of cooling the char product is to combine the cooling of solids with a preheating of boiler feed water and the conveying to a desired plant height. For this, a process with an annular fluidized bed reactor system combined with a vertical pneumatic transport reactor as described in DE 102 60 738 can be used. Cooling bundles can be inserted into the fluidized bed annual ring to transfer heat for an economizer of the waste heat boiler in the off gas train.

Developments, advantages and possibilities for applying the present invention may also be taken from the following description of embodiments and from the drawings. All described and/or illustrated features per se or in combination form the subject matter of the present invention, independent of their inclusion in the claims or their back reference.

The plant depicted in FIG. 1 comprises a fluidized bed reactor 1 having a circulating fluidized bed and a cyclone 2 which is provided downstream of the circulating fluidized bed reactor 1 (CFB reactor). A first inlet 3 for introducing a primary fluidizing gas, a second inlet 4 for introducing a secondary gas and a third inlet 5 for introducing solids are provided in the fluidized bed reactor 1. The first inlet 3 is connected to a supply of steam and gas or air or mixtures with these gases. The second inlet 4 is connected to a supply of oxygen enriched gas or air or mixtures with these gases. Thus, the oxygen availability is significantly higher in the upper region of the reactor 1 into which oxygen enriched gas or air is introduced via the second inlet 4 compared with the lower region of the reactor 1 in which the first inlet 3 is located. The third inlet 5 may be part of a pneumatic transportation system (not shown in FIG. 1) to feed dry coal or the like carbonaceous material into the fluidized bed reactor 1. Alternatively the coal could be introduced into the CFB reactor using a system of lock hopper and mechanical, volumetric conveying as, for example, rotary valves or screw conveyors.

Upstream of the fluidized bed reactor 1 there may be provided a stockpile from which coal is fed with a transport system to a wet coal bin which may have a storage capacity for 15 hours of operation. Further, a coal crushing and drying system may be provided in which the received coal is crushed to particle sizes of below 10 mm and simultaneously dried to remove surface moisture as far as possible. The coal may be stored in a bin for dried coal prior to continuously introducing it via a pneumatic conveying and dosing system into the fluidized bed reactor 1.

Figure 2:
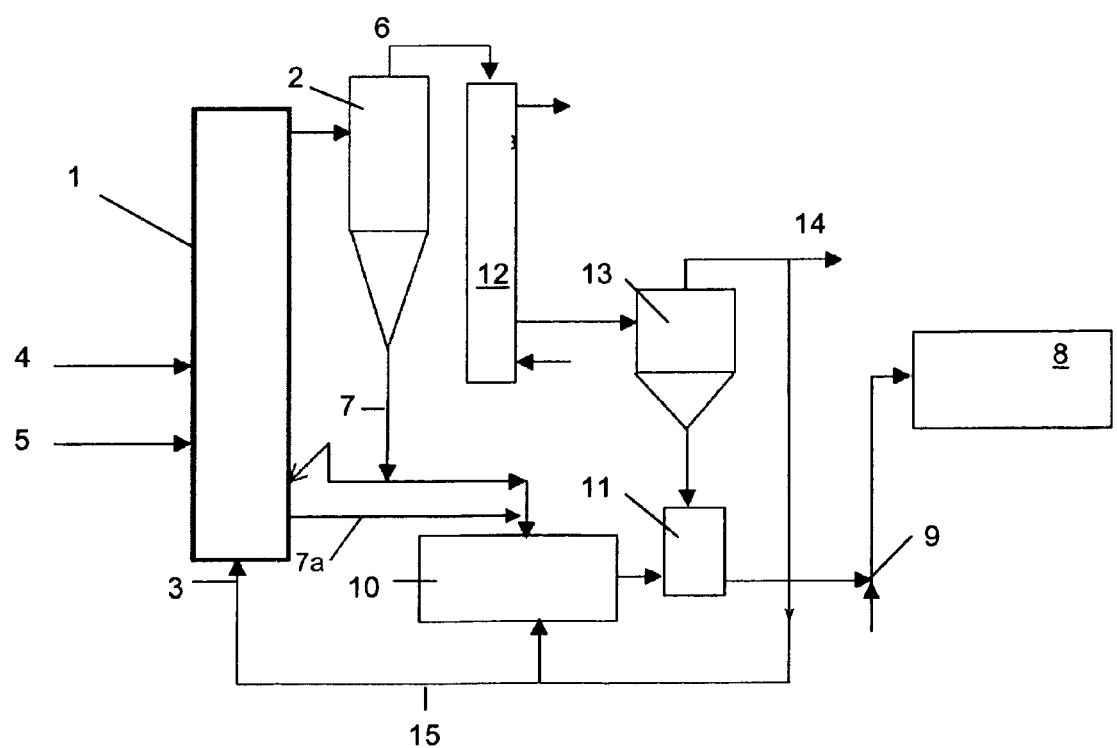
FIG. 2 shows a process diagram of a process and a plant in accordance with a second embodiment of the present invention.

To achieve uniform gas velocity along the entire height of the circulating fluidized bed reactor 1, the cross-section of the reactor can be conically shaped at the bottom zone (not shown in FIG. 1). As depicted in FIG. 2, recycle gas may be introduced into the process as fluidization gas via a nozzle grid. Due to the high gas velocity the solids are entrained over the full height of the fluidized bed reactor 1 such that the suspended solids are in a constant motion. The solids either leave the reactor with the gas stream and are recycled via cyclone 2 (external circulation) or flow back on the reactor walls to be re-entrained in the fluidizing gas at the reactor bottom (internal circulation). This intense solids/gas mixing behaviour is characteristic for systems with a circulating fluidized bed and ensures excellent heat and mass transfer as well as an almost uniform temperature distribution over the fluidized bed reactor 1.

Fuel gas produced in the fluidized bed reactor 1 and solids entrained therewith are discharged into cyclone 2 for separating char and dust from the fuel gas which may be discharged via a conduit 6. A major part of the particles entrained in the gas leaving the fluidized bed reactor 1 are separated from the process gas in the recycle cyclone 2 and are returned via conduit 7 into the circulating fluidized bed via a seal pot forming the external circulation loop. Material from the seal pot as well as from the lower part of the fluidized bed reactor 1 via conduit 7a is discharged by means of water-cooled discharge devices at such a rate that a constant differential pressure is maintained over the reactor height, which is a measure for the reactor inventory.

Solids like char and dust discharged from cyclone 2 via conduit 7 or discharged from an outlet of the fluidized bed reactor 1 via conduit 7a may be fed into a further reactor 8 such as a smelting furnace for smelting reduction of iron or a rotary kiln for reduction of ilmenite. Hot char and the like may be transferred from conduit 7 into reactor 8 via a pneumatic injection and transport system 9 indicated by arrows in FIG. 1.

Turning now to FIG. 2, the plant is provided with a fluidized bed reactor 1 and a cyclone 2 as described above.

Upstream of the fluidized bed reactor 1 there may be provided a wet coal storage bin, a coal crushing and drying system, a dried coal storage bin and/or a pneumatic transportation for dried coal (not shown in the drawings).

Hot char discharged from cyclone 2 via conduit 7 and/or from the fluidized bed reactor 1 is fed into a fluidized bed cooler 10. The char may then be introduced in a transmitting vessel 11 and/or transferred to a further reactor 8 via the injection and transport system 9 which is a hot conveying system.

The fluidized bed cooler 10 is moderately fluidized achieving low gas velocities, just enough to keep the solids in motion and to allow mixing of coarse and fine particles. By injection of water or control of the temperature with other means (such as cooling bundles), the final temperature of the material can be adjusted to cope with the maximum conveying temperature of 850° C. The offgas (fuel gas) leaving the fluidized bed cooler 10 may be injected into a process gas system prior to a process gas scrubber. A volatile content of lower than 3 wt.-% in the discharged char is assumed.

The fuel gas leaving cyclone 2 via conduit 6 is introduced at approximately 1000° C. into a waste heat boiler 12 in which steam is produced by heating boiler feed water. After being cooled in the waste heat boiler 12, the fuel gas is at least partly dedusted in a multiclone 13 which is provided downstream of the waste heat boiler 12. The dust discharged from the multiclone 13 may be mixed with the char discharged from the circulating fluidized bed and transferred into the fluidized bed cooler 10 or into transmitting vessel 11.

The fuel gas leaving multiclone 13 at about 400° C. may be subjected to further cleaning and/or cooling to approximately 30° C. in a process gas scrubber unit (not shown). The energy of the produced fuel gas may be used, for example, to pre-dry and/or pre-heat the carbonaceous material and/or preheat other process materials. The process water from the scrubber is treated in a clarifier and a carbon rich sludge is produced. The clarifier overflow is recycled to the scrubber. The carbon rich sludge may be recycled to the coal crushing and drying plant or can be recycled directly into the process furnace, maybe after, for example, agglomeration or compaction.

In a closed circuit gas flow system the cleaned and cooled fuel gas may then be discharged via conduit 14 or at least partly reintroduced into the process via conduit 15. This amount can be controlled and/or adjusted. As shown in FIG.

2, the fuel gas may be fed into fluidized bed cooler 10 as fluidizing gas and/or may be fed into fluidized bed reactor 1 as fluidizing gas. Prior to the use of the fuel gas or the recycle gas, the contents of the gas may be controlled and/or adjusted by adding or removing components like steam, $CO_2$ or $H_2S$.

The plant may be operated under ambient pressure conditions or, for example, at a pressure of above 5 bar. However, due to pressure losses and material load, the resulting pressure will be higher. Thus, a recycle gas compressor recompressing the process gas flow may be provided to compensate for the pressure loss of the plant. The process water and machinery cooling water is cooled down in cooling towers and recycled back.

Example 1

Production of Char and Fuel Gas

In a plant as depicted in FIG. 2, char and fuel gas are produced using 385 t/h wet subbituminous coal as carbonaceous material which is crushed and dried to reduce the moisture content to 14 wt.-% and is then fed via inlet 5 into the circulating fluidized bed of fluidized bed reactor 1. The composition of the fed coal is as follows: 77 wt.-% (daf=dry and ash free) C, 4.1 wt.-% (daf) H; 16.91 wt.-% (daf) O; 0.65 wt.-% (daf) S; 1.34 wt.-% (daf) N and 9.1 wt.-% ash. The volatile content is 35.3 wt.-% (d.b.=dry basis) and the fixed carbon contend is 55.6 wt.-% (d.b.).

The coal is partly combusted and gasified in the circulating fluidized bed using 62,000 $Nm^3/h$ oxygen (95% $O_2$) and 5 t/h low pressure steam (900 kPag) which are fed into the reactor via inlets 4 as a secondary gas. The reactor is fluidized using 90,000 $m^3/h$ (STP) of recycle gas with 39.3% CO, 13.1% $CO_2$, 37.6% $N_2$, 1.4% $H_2O$, 2.4% $CH_4$, 0.4% $H_2S$, 5.8% $N_2$ which is introduced via inlets 3. The temperature in the circulating fluidized bed is greater than 1000° C. and the pressure is 500 kPag.

The partial combustion and gasification of carbon is performed according to the following reaction:

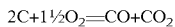

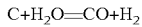

A $CO/CO_2$ ratio of 2.90 is assumed for the process gas leaving the circulating fluidized bed reactor 1. 274,000 $m^3/h$ (STP) fuel gas with the following composition is produced: 12.7 vol.-% $CO_2$; 6.0 vol.-% $N_2$; 0 vol.-% $O_2$; 40.1 vol.-% CO; 38.6 vol.-% $H_2$ and 2.5 vol.-% $CH_4$; 0.1 vol.-% $H_2O$; 50 ppmv $H_2S$.

Further, 152 t/h of char with a carbon content of 80 wt.-% and 2 wt.-% volatiles (remaining ash) is produced. This solid product which consists of carbon and ash may be discharged either at the recycling line after the recycling cyclone 2 or from the bottom of the fluidized bed reactor 1. Generated dust which is too fine to be discharged in the recycling cyclone 2 is discharged in multiclone 13 with the char from the fluidized bed reactor 1 and the dust from the multiclone 13 being mixed in a fluidized bed reactor 10 which is also used to cool the products to a temperature of lower than 850° C. As an alternative, the multiclone dust stream may be combined with the cooled product from the fluidized bed cooler 10.

The fluidized bed reactor 10 uses cold recycling gas for fluidization and cooling. Further, water may be injected into fluidized bed reactor 10 for further cooling if appropriate. As an alternative, an indirect cooler may be used.

The product from the fluidized bed reactor 10 is transferred into an injection vessel 11 from where it is conveyed to a further reactor 8, for example, a smelting reduction vessel using a hot conveying system. As an alternative, the product may be stockpiled or filled into closed silo train bins for transport.

The fuel gas leaving the cyclone 2 downstream of the fluidized bed reactor 1 is cooled in waste heat boiler 12 to a temperature below 450° C. prior to entering the fuel gas into multiclone 13. Ultrafines, which have not been able to be discharged in the multiclone may be discharged as sludge from a venturi type scrubber (not shown). The sludge may then be transported to a clarifier. It is assumed that 10 wt.-% of the produced char is collected as sludge. In an integrated plant this sludge may be recycled via the coal drying and crushing unit (not shown) upstream of the fluidized bed reactor 1.

Further, the process gas (fuel gas) discharged from multiclone 13 may be further cooled down in a process gas cooler (not shown) and may then be delivered to a battery limit (not shown) for further use. A part of the process gas is recycled via conduit 15 and serves as fluidization gas for the circulating fluidized bed of fluidized bed reactor 1 and fluidized bed cooler 10. In addition, some amount of the process gas is used as fuel gas for the coal drying.

The present invention is not limited to embodiments described herein; reference should be had to the appended claims.

REFERENCE NUMERALS 1 circulating fluidized bed reactor
2 cyclone
3 first inlet (gas)
4 second inlet (gas)
5 third inlet (solids)
6 conduit
7, 7a conduits
8 further reactor
9 injection and transport system
10 fluidized bed cooler
11 vessel
12 waste heat boiler
13 multiclone
14 conduit
15 conduit

The invention claimed is:

1. A method for producing char and fuel gas, the method comprising:
providing a carbonaceous material to a lower or bottom region of a fluidized bed reactor operating at a temperature of more than about 1000° C. and at a pressure of from about 1 bar to about 40 bar, an oxygen availability in the lower or bottom region of the fluidized bed reactor being less than 80% of an oxygen availability in an upper region of the fluidized bed reactor such that the carbonaceous material is degasified in the lower or bottom region of the fluidized bed reactor and is partially combusted in the upper region of the fluidized bed reactor with oxygen-containing gases, the upper region of the reactor being above the lower or bottom region of the reactor; and
adjusting a supply of oxygen within the fluidized bed reactor so as to recover more than 60% of fixed carbon in the carbonaceous material in a char product.

2. The method as recited in claim 1, wherein the supply of oxygen within the fluidized bed reactor is adjusted or regulated so that the oxygen availability in the lower or bottom region of the fluidized bed reactor is less than 50% of the oxygen availability in the upper region of the fluidized bed reactor.

3. The method as recited in claim 1, further comprising feeding a gas with an oxygen content of less than 5% into the lower or bottom region of the fluidized bed reactor as a fluidization gas.

4. The method as recited in claim 1, further comprising feeding a gas with an oxygen content of 50% to about 100% into the upper region of the fluidized bed reactor as a secondary gas.

5. The method as recited in claim 1, wherein a temperature of a reaction in the fluidized bed reactor is between about 1000° C. and about 1100° C.

6. The method as recited in claim 1, wherein a pressure of a reaction in the in the fluidized bed reactor is above about 5 bar.

7. The method as recited in claim 1, further comprising feeding a mixture of steam and a gas into the fluidized bed reactor as a primary fluidizing gas.

8. The method as recited in claim 1, wherein the produced fuel gas has a minimum heating value of 9 MJ/Nm$^3$ (STP).

9. The method as recited in claim 8, further comprising recycling and reusing a part of the produced fuel gas as fluidizing gas in the fluidized bed reactor.

10. The method as recited in claim 1, further comprising transferring the produced char into a plant at a temperature of more than about 750° C.

11. The method as recited in claim 10, wherein the plant includes at least one of a smelting furnace and a rotary kiln.

12. The method as recited in claim 10, further comprising transferring the produced char into a metallurgical process plant by at least one of pneumatic injection and transport system.

13. The method as recited in claim 12, wherein the metallurgical process plant is configured to perform at least one of smelting reduction of iron, electric winning of metals and reduction of ilmenite.

14. The process as recited in claim 10, further comprising conveying the produced char to a desired plant height so as to cool the char and preheat a boiler feed water using thermal energy of the char.

15. The process as recited in claim 1, wherein a volatile content of the produced char is below 10 wt.-%.

* * * * *